(12) United States Patent
Orlowski

(10) Patent No.: US 10,539,802 B2
(45) Date of Patent: Jan. 21, 2020

(54) REFLECTIVE PILOT LIGHT VIEWER

(71) Applicant: Jerrold M. Orlowski, Minocqua, WI (US)

(72) Inventor: Jerrold M. Orlowski, Minocqua, WI (US)

(*) Notice: Subject to any disclaimer, the term of this patent is extended or adjusted under 35 U.S.C. 154(b) by 454 days.

(21) Appl. No.: 14/529,649

(22) Filed: Oct. 31, 2014

(65) Prior Publication Data
US 2015/0122200 A1    May 7, 2015

Related U.S. Application Data

(60) Provisional application No. 61/962,185, filed on Nov. 4, 2013.

(51) Int. Cl.
| F24H 9/02 | (2006.01) |
| G02B 27/02 | (2006.01) |
| F23M 11/04 | (2006.01) |
| F24H 9/20 | (2006.01) |
| G02B 7/182 | (2006.01) |

(52) U.S. Cl.
CPC ......... G02B 27/028 (2013.01); F23M 11/042 (2013.01); F23M 11/045 (2013.01); F24H 9/2035 (2013.01); G02B 7/182 (2013.01); G02B 27/022 (2013.01); F23N 2027/22 (2013.01); F24H 9/02 (2013.01)

(58) Field of Classification Search
CPC ...... F24H 9/2035; F24H 9/1836; F24H 1/186; G02B 27/022; G02B 27/028; G02B 7/182; F22B 37/38; F22B 37/42; F22B 37/36; F23M 11/042; F23M 11/045; F27D 21/02; F27D 21/04

USPC ................ 122/494, 13.01, 17.1, 504.2, 497; 359/871

See application file for complete search history.

(56) References Cited

U.S. PATENT DOCUMENTS

| 746,203 | A | * | 12/1903 | Trowbridge | ............ F24C 3/085 |
| | | | | | 126/190 |
| 2,355,466 | A | * | 8/1944 | Perry | ...................... F23M 9/00 |
| | | | | | 110/260 |
| D188,735 | S | | 8/1960 | Buttles et al. | |
| 3,004,474 | A | | 10/1961 | Hund | |
| 3,536,029 | A | | 10/1970 | Kuwayama et al. | |
| (Continued) | | | | | |

FOREIGN PATENT DOCUMENTS

DE    20019192 U1    3/2002

OTHER PUBLICATIONS

Printed information containing similar products available in the marketplace, 12 pages.

(Continued)

*Primary Examiner* — Steven B McAllister
*Assistant Examiner* — Ko-Wei Lin
(74) *Attorney, Agent, or Firm* — Boardman & Clark LLP

(57) ABSTRACT

A reflective pilot light viewer is disclosed. The reflective pilot light viewer has an attachment flange securable to a water heater tank by fasteners. The reflective pilot light viewer also has a viewing segment joined to the attachment flange and extending from the access outer panel at an approximate forty-five degree to fifty degree angle, the viewing segment having an upper portion which is a reflective surface. An access outer panel having the reflective pilot light viewer and a water heater having the reflective pilot light viewer are also disclosed.

14 Claims, 10 Drawing Sheets

(56) References Cited

U.S. PATENT DOCUMENTS

| | | | |
|---|---|---|---|
| D279,131 S | | 6/1985 | McDaris |
| D310,584 S | | 9/1990 | Cadet |
| D334,694 S | | 4/1993 | McCoy |
| 5,625,500 A | * | 4/1997 | Ackerman .............. B60R 1/003 248/467 |
| D379,656 S | | 6/1997 | Reynolds et al. |
| 5,992,648 A | * | 11/1999 | Saunders .............. A47F 5/0846 211/35 |
| 6,036,325 A | * | 3/2000 | Su ............................. B60R 1/06 248/475.1 |
| 6,210,009 B1 | | 4/2001 | Daly |
| D454,701 S | | 3/2002 | Eric |
| 6,439,171 B1 | | 8/2002 | McCall |
| 6,550,926 B2 | | 4/2003 | Berger |
| D527,915 S | | 9/2006 | Lewis |
| 7,934,843 B2 | * | 5/2011 | Lynam ...................... B60R 1/08 359/866 |
| 2002/0189554 A1 | * | 12/2002 | Kohler ................. F23M 11/042 122/13.01 |
| 2011/0277706 A1 | * | 11/2011 | Arnold ................... F24H 1/205 122/14.1 |

OTHER PUBLICATIONS

International Search Report and Written Opinion of the International Searching Authority dated Jan. 21, 2015, for International Appln. No. PCT/US2014/063632.

* cited by examiner

REFLECTIVE PILOT LIGHT VIEWER

CROSS-REFERENCE TO RELATED APPLICATIONS

This application claims priority to U.S. Provisional Patent Application, Ser. No. 61/962,185, filed Nov. 4, 2013, entitled "Reflector, a.k.a.—reflective pilot light viewer" the entire contents of which is hereby incorporated by reference in its entirety.

FIELD

The inventions described herein relate to a device for viewing a pilot light. More specifically, the inventions described herein relate to devices for viewing a pilot light in hot water heater systems such as, for example, gas-type hot water heater systems which have a pilot light and burner.

BACKGROUND

Conventional hot water heaters include storage-type hot water heaters and tankless-type hot water heaters. Many household and commercial hot water heaters in use today are storage-type hot water heaters and newer models which are flammable vapor ignition resistant (FVIR) water heaters. Many consist of a water tank that has a standing pilot light, or a pilot light that is always on, and a single thermo-mechanical bimetallic gas valve underneath. When the water in the tank cools to below the set temperature threshold of a thermostat, the cooling causes the valve to open which allows the gas to flow to the main burner and be lighted by the standing pilot light. When the water temperature in the tank rises and satisfies the set temperature threshold of the thermostat, the valve is then closed. As a result, these hot water heaters require a standing pilot light to be lit twenty-four (24) hours a day.

If, for any reason, the pilot light fails or extinguishes, the flow of unlit gas must be stopped for safety and the pilot light relit. Unfortunately, to view a pilot light in order to determine if it is lit, particularly in a hot water heater with an inner panel (sealed combustion-FVIR), an individual must crouch down low or get on hands and knees to look into a small cloudy grommeted glass window or below the unit. In the alternative, a user may need to remove the lower inner and outer covers of the older water heater, potentially placing the user in a dangerous condition.

Accordingly, a means to view a pilot light in a safe and comfortable position is needed.

SUMMARY

A reflective pilot light viewer is disclosed. The reflective pilot light viewer has an attachment flange securable to a water tank by fasteners. The reflective pilot light viewer also has a viewing segment joined to the attachment flange and extending from the access outer panel at an approximate forty-five degree to fifty degree angle, the viewing segment having an upper portion which is a reflective surface.

An access outer panel for a water heater is also disclosed. The access outer panel includes a panel body having first and second flanges offset from the panel body and arranged to slot within an opening in a water tank of the water heater. The panel body also has a viewing window which may be, for example, an opening or hole punch out which aligns with a pilot light when the access outer panel is positioned on the water tank, and a reflective pilot light viewer. The reflective pilot light viewer includes an attachment flange securable to the panel body by fasteners below the viewing window and a viewing segment extending upwards from the access outer panel at an approximate forty-five degree to fifty degree angle, the viewing segment having an upper portion which is a reflective surface and aligned with the viewing window so as to reflect the pilot light.

A water heater is further disclosed. The water heater includes a water tank having a gas control, a thermostat control and thermocouple for controlling a gas-fired burner, and a pilot light to ignite the gas flowing into the burner. An outer access panel is provided which is removable from a lower portion of the water tank. The access outer panel has a viewing window positioned horizontally adjacent to the pilot light and a reflective pilot light viewer attached to the access outer panel proximate and below the viewing window. The reflective pilot light viewer has an attachment flange which is secured to the access panel, and a viewing segment extending from the access outer panel at an approximate forty-five degree to fifty degree angle, the viewing segment having an upper portion which is a reflective surface and is aligned with the viewing window so as to reflect the pilot light.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

A device for viewing a pilot light is disclosed. More specifically, a reflective pilot light viewer is provided which is attached to a lower outer cover or access outer panel of a water heater.

Figure 1:
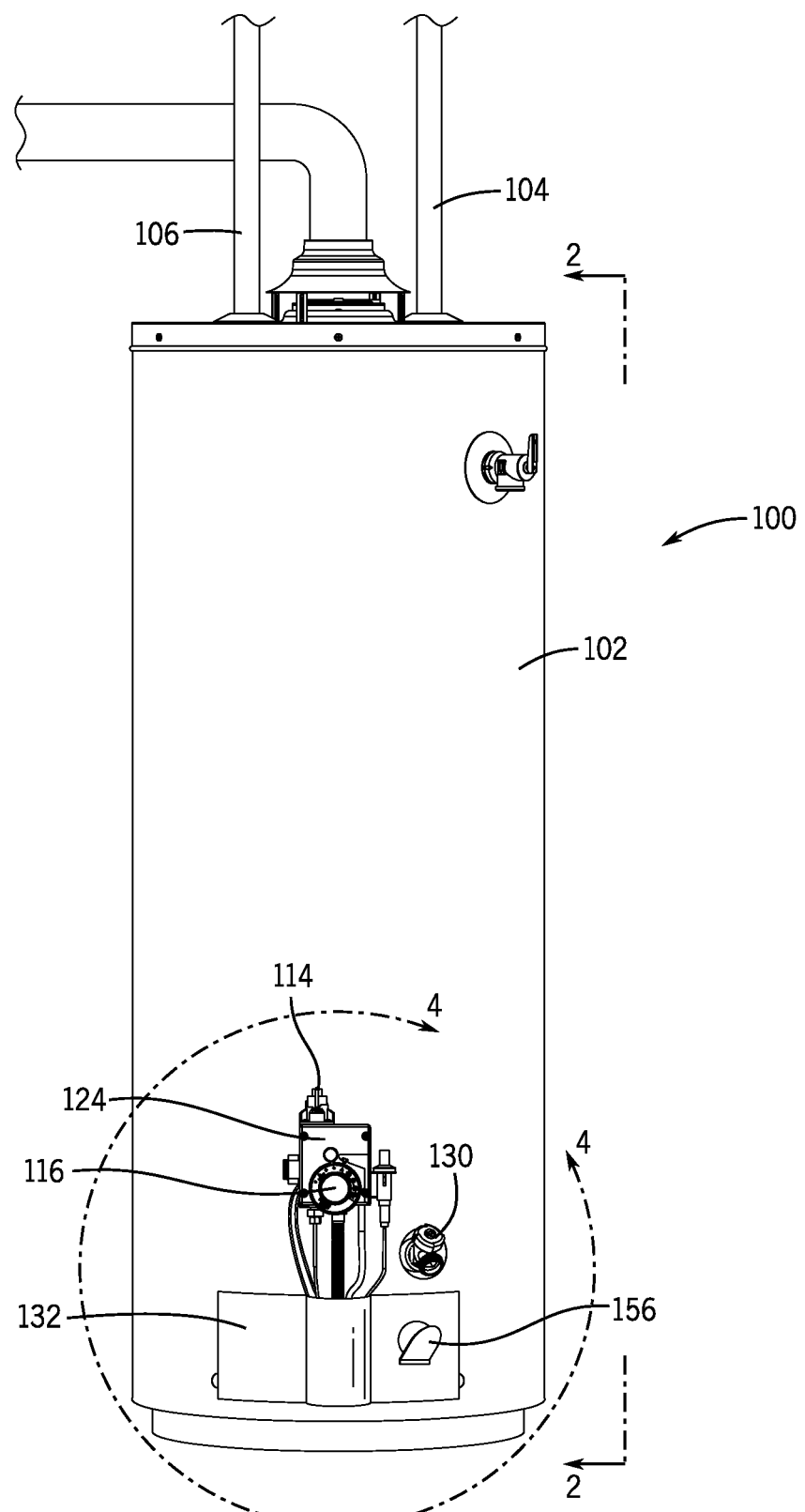
FIG. 1 is perspective view of a water heater according to one or more examples of embodiments.
Figure 2:
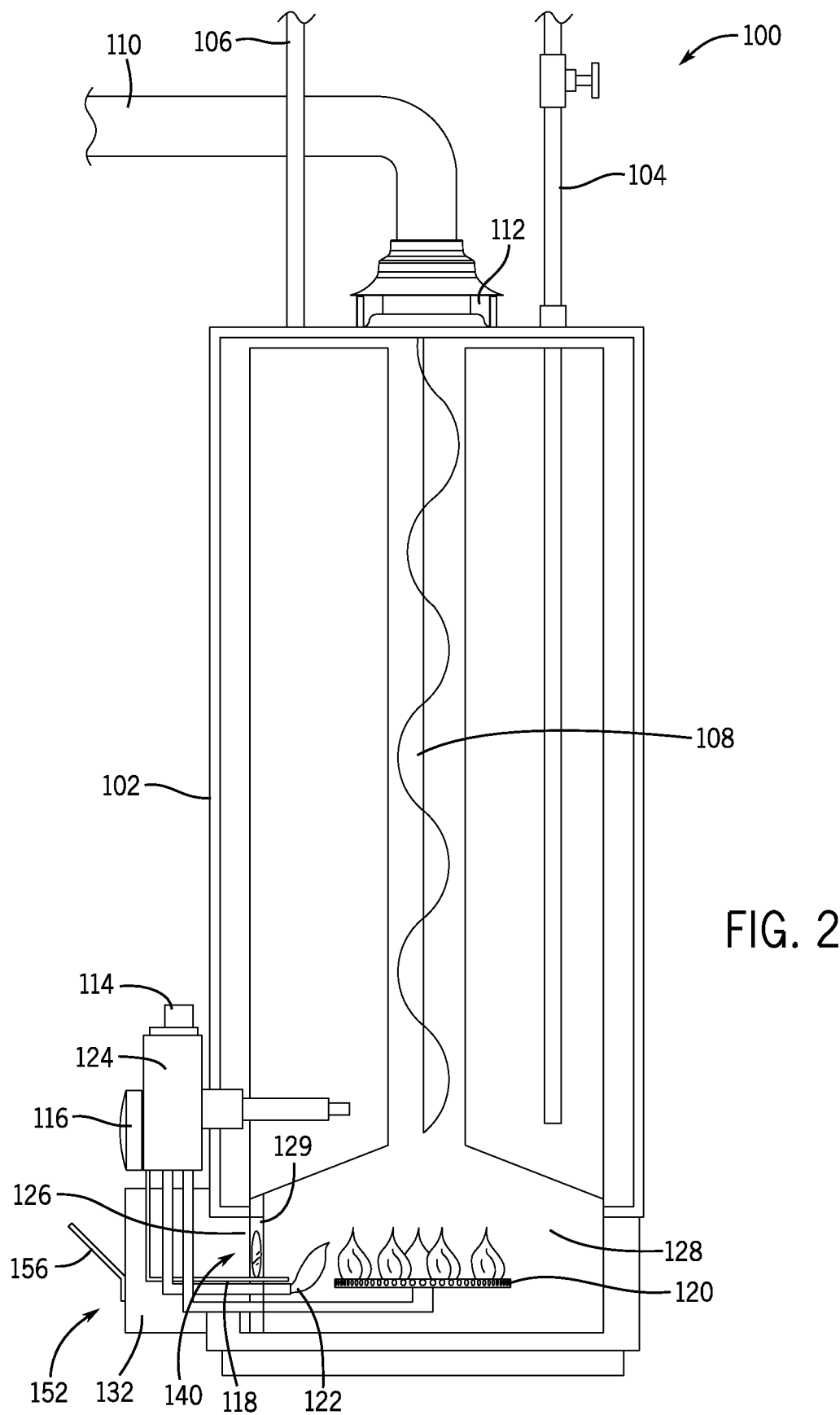
FIG. 2 is a cross-sectional view of the water heater of FIG. 1, taken from line 2-2 of FIG. 1.

Referring to FIGS. 1-2, a water heater 100 is provided. The water heater 100 illustrated in FIG. 1 is a storage-type hot water heater. The water heater 100 has a water tank 102, which is typically an insulated tank, and is connectable to water system in a residential or commercial building. For example, the water tank 102 may have a cold water inlet pipe 104 and a hot water exit pipe 106 connectable to the building's water supply and distribution lines. In some examples of embodiments, a spiral heat exchanger 108 may also be provided in the center of the water tank 102. Additionally, the water tank 102 may have a flue pipe 110 connectable to the top of the tank 102 and in communication with, for example, the spiral heat exchanger 108, for venting of gases, as well as an air inlet 112. The water tank 102 may also have a gas control 114, thermostat control 116 and thermocouple 118 for controlling a gas-fired burner 120. A pilot light 122 is also provided in conjunction with the burner 120, to ignite the gas flowing into the burner 120. The pilot light 122 in one or more examples of embodiments is a standing pilot light, or a pilot light that is always lit. A thermo-mechanical gas valve 124 may be provided adjacent or underneath the pilot light 122 in connection with the burner 120. The burner 120 and pilot light 122 are provided in a combustion chamber 128 at the base of the water tank 102. An air intake opening 126 may be provided in or at the lower portion of the water tank 102, and specifically the combustion chamber 128. An inner sealed panel 129 or door with grommeted glass 131 may also be provided (see FIG. 3). A water drain valve 130 may also be provided on a lower portion of the tank 102.

Figure 3:
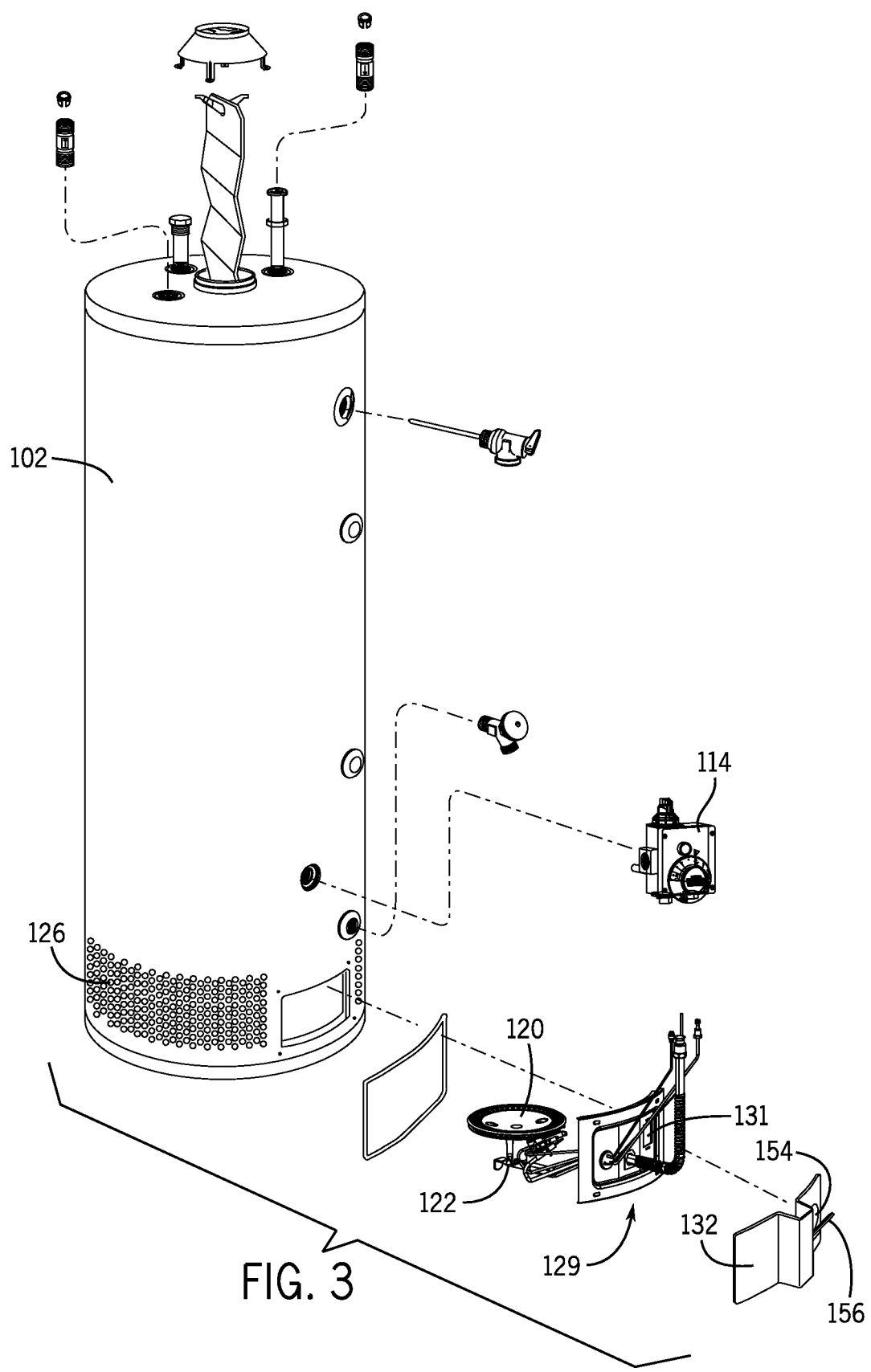
FIG. 3 is a perspective exploded view of one or more examples of embodiments of a water heater for use an outer panel and reflective pilot light viewer.
Figure 4:
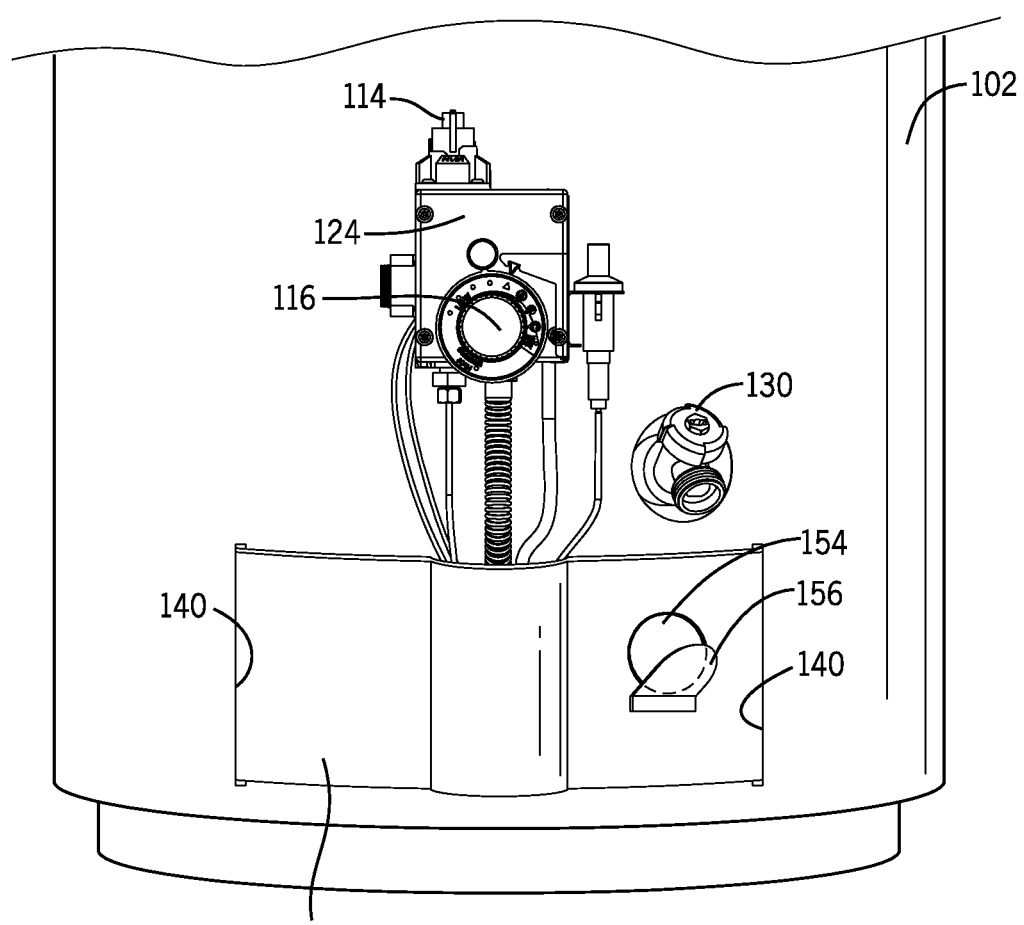
FIG. 4 is a partial perspective view of the water heater of FIG. 1, taken from section 4-4 of FIG. 1.
Figure 5:
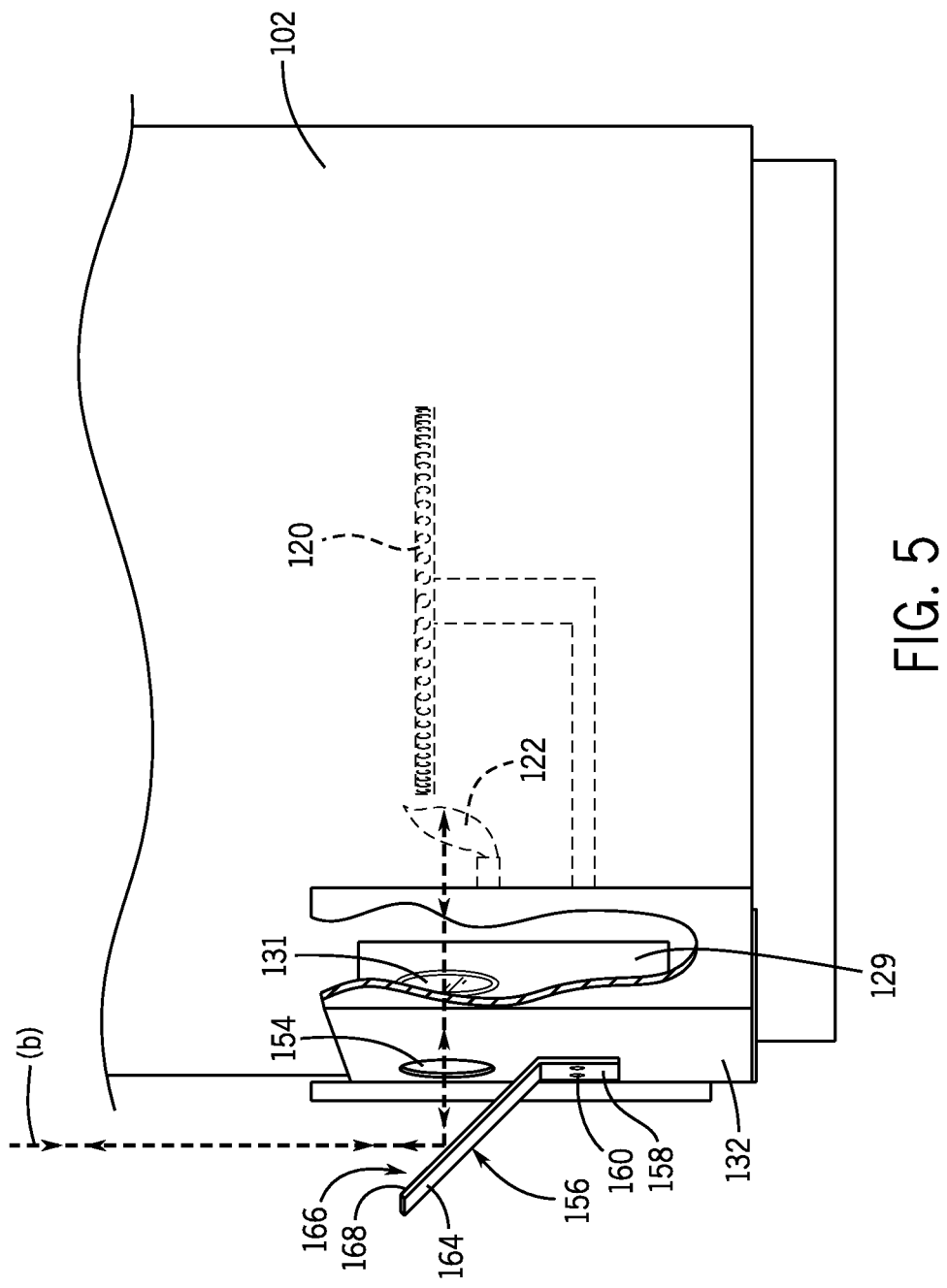
FIG. 5 is a partial cut away perspective view of the water heater, showing the sight line of the pilot light facilitated by the access outer panel and reflective pilot light viewer described herein.
Figure 6:
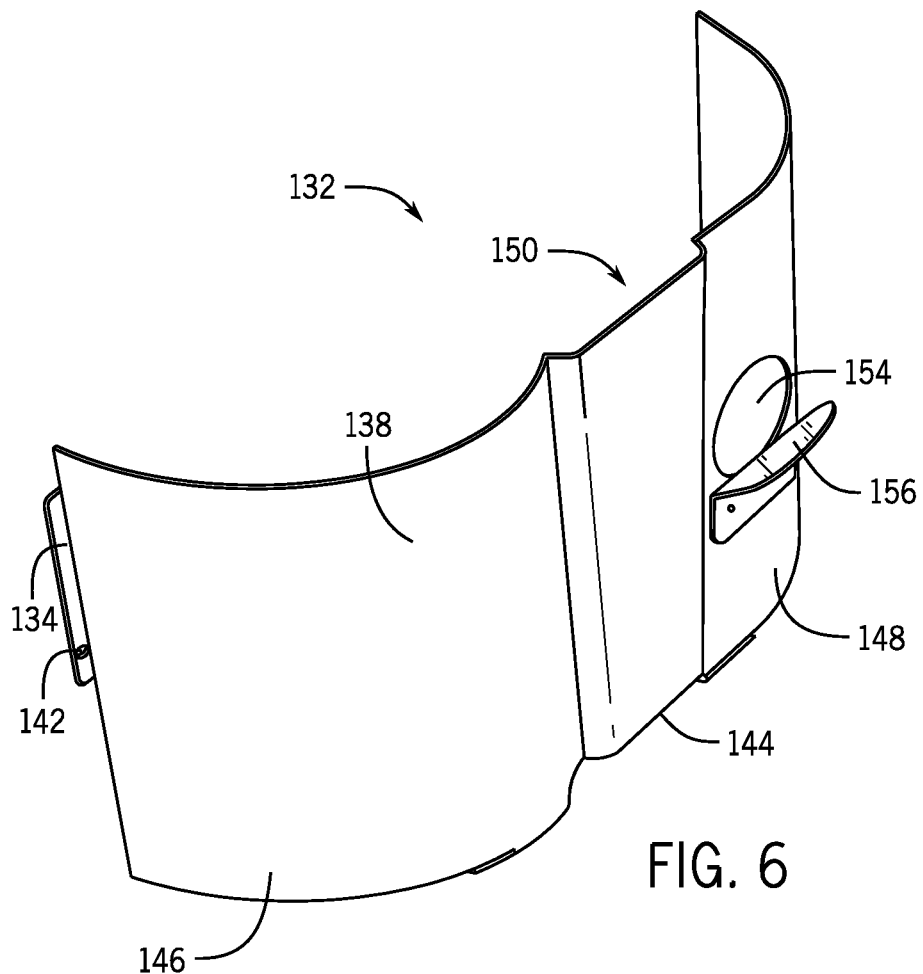
FIG. 6 is a perspective view of an access outer panel for use with the water heater of FIG. 1.
Figure 7:
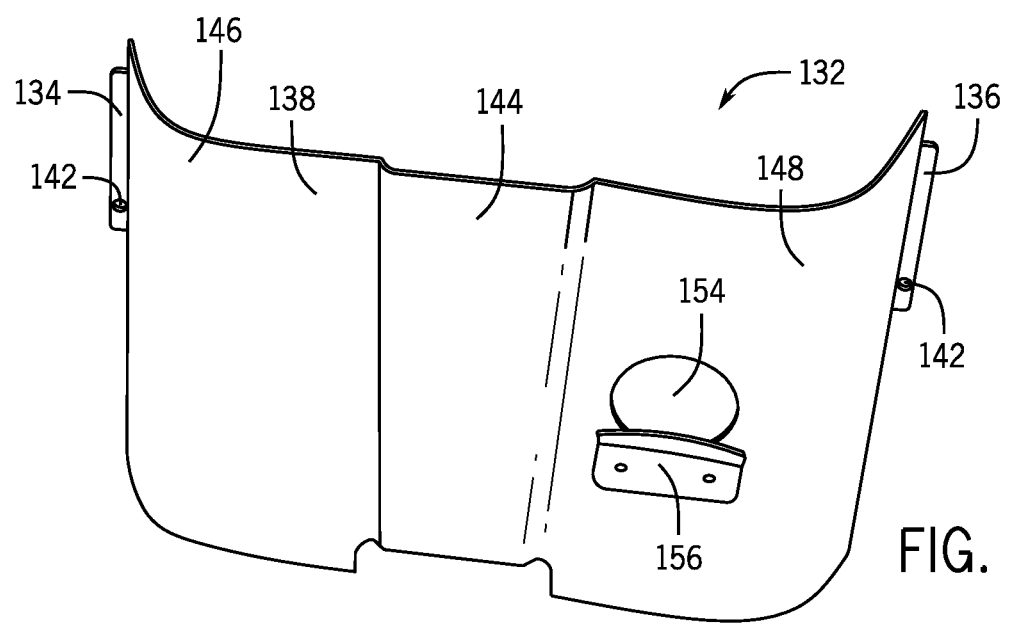
FIG. 7 is an alternative perspective view of an access outer panel for use with a water heater.
Figure 8:
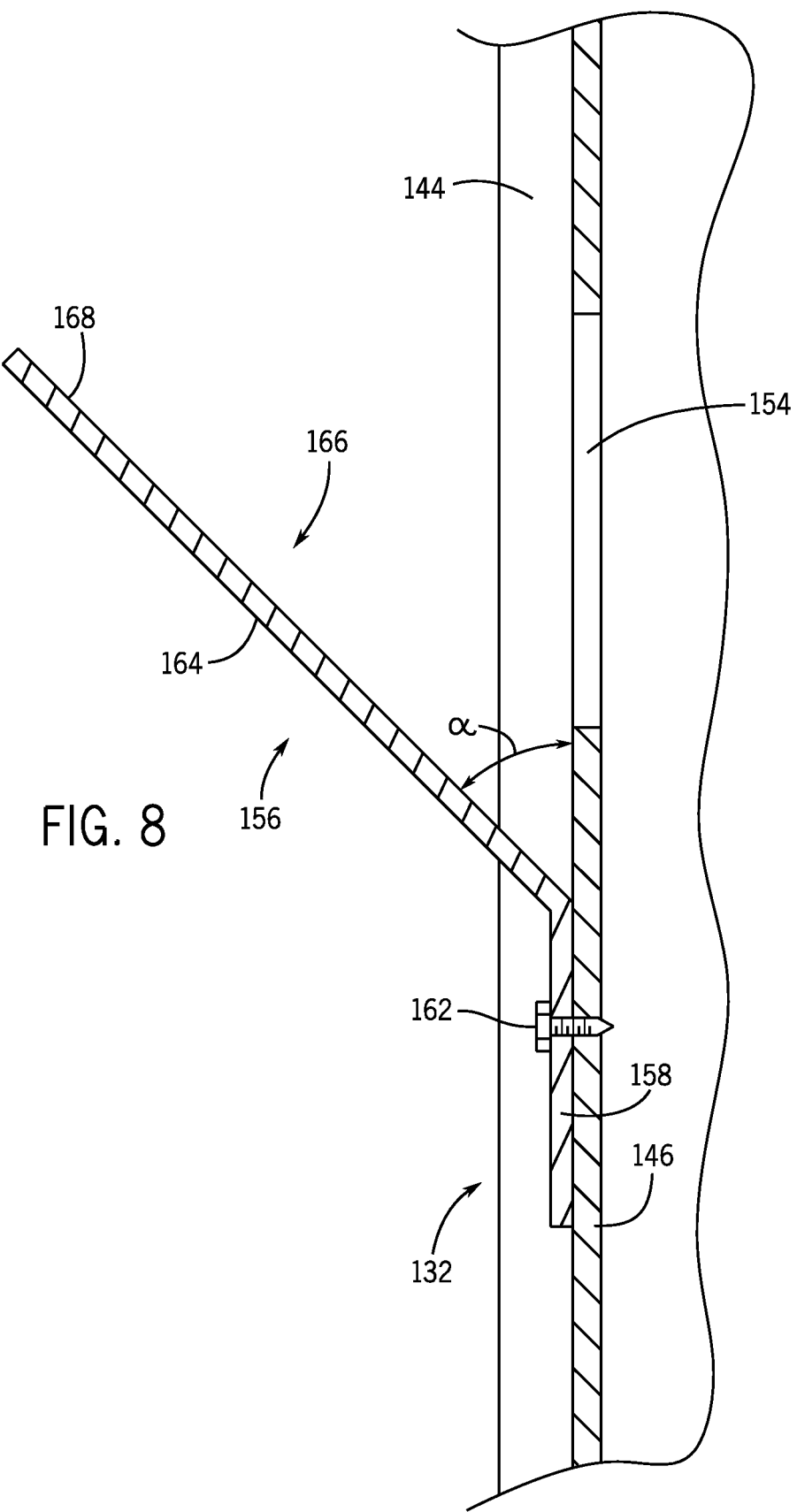
FIG. 8 is a cut-away side elevation view of the access outer panel and attached reflective pilot light viewer.
Figure 9:
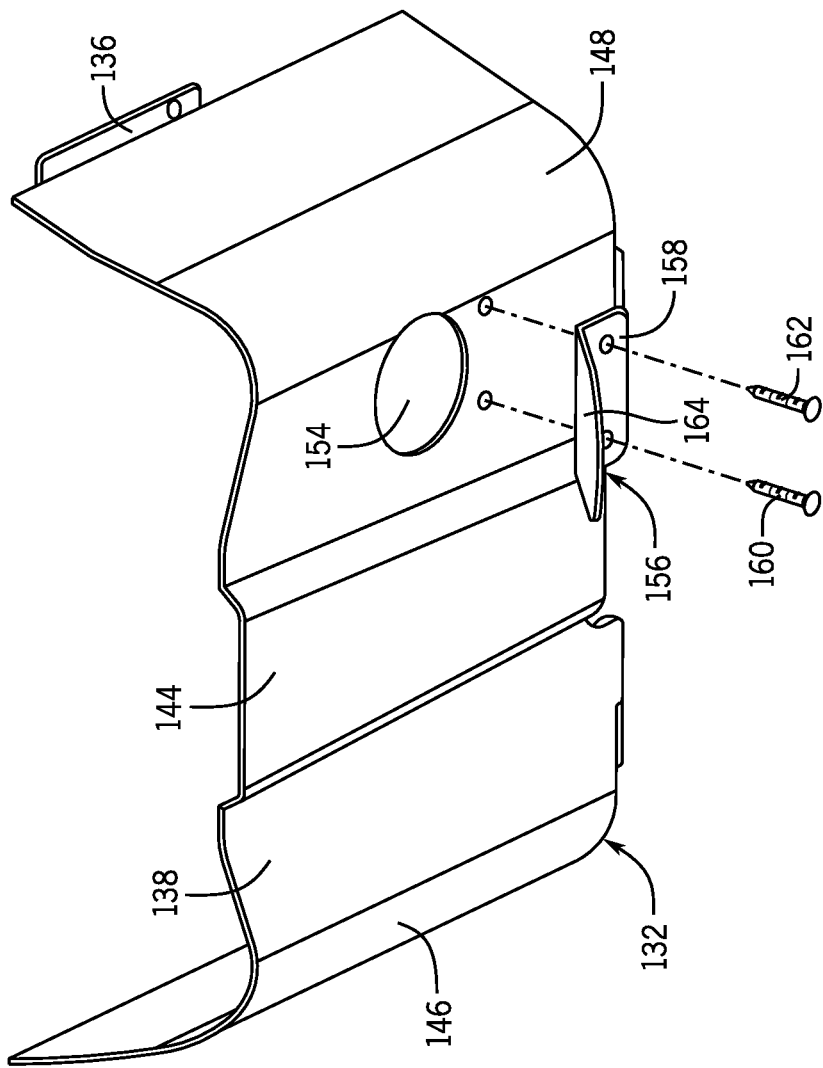
FIG. 9 is an exploded view of an access outer panel according to one or more alternative examples of embodiments, showing the reflective pilot light viewer separated from the access panel.
Figure 10:
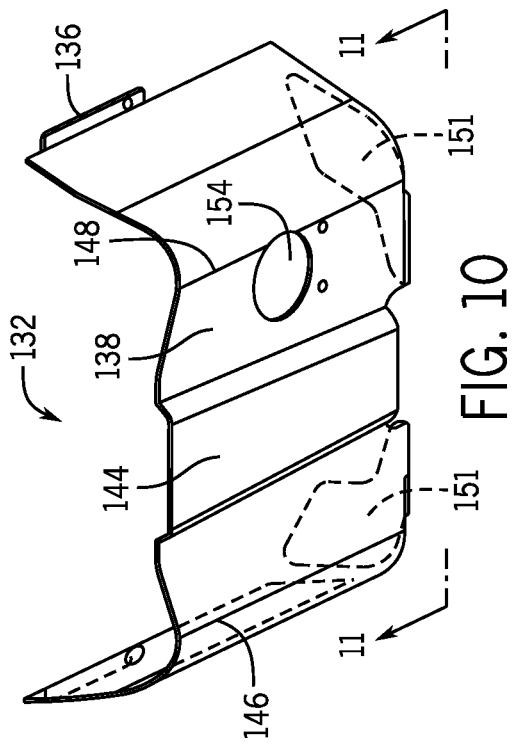
FIG. 10 is a perspective view of an alternative embodiment of the access outer panel shown in FIG. 9.
Figure 13:
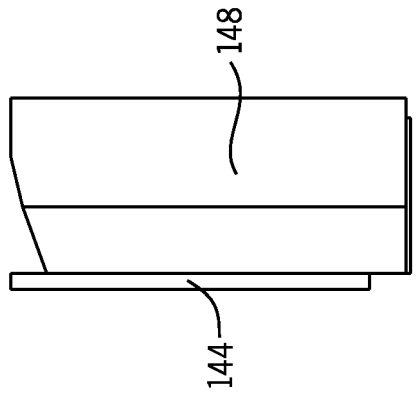
FIG. 13 is a side elevation view of the access outer panel shown in FIG. 10, taken from line 13-13 of FIG. 12.
Figure 11:
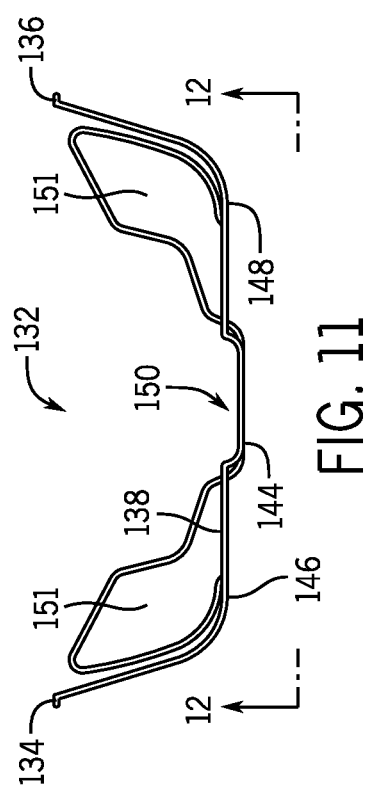
FIG. 11 is a plan view of the access outer panel shown in FIG. 10, taken from line 11-11 of FIG. 10.
Figure 12:
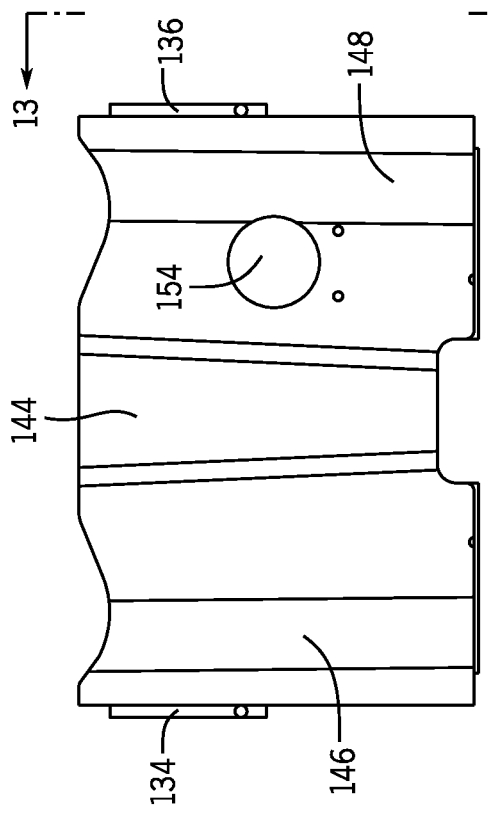
FIG. 12 is a front elevation view of the access outer panel shown in FIG. 10, taken from line 12-12 of FIG. 11.
Figure 14:
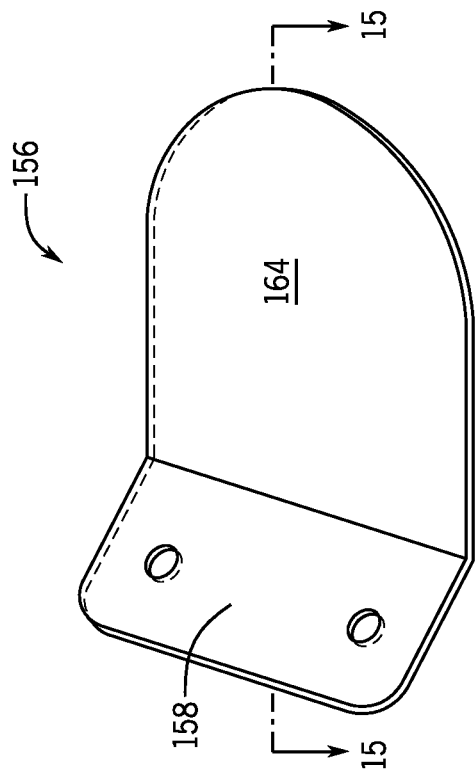
FIG. 14 is a perspective view of a reflective pilot light viewer for use with the access outer panel and water heater described herein.
Figure 17:
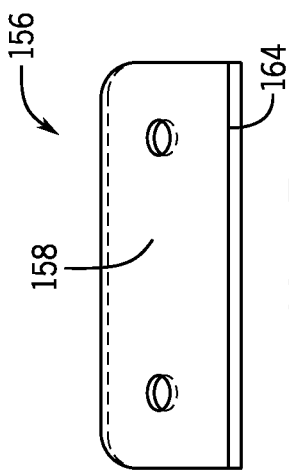
FIG. 17 is an end elevation view of the reflective pilot light viewer shown in FIG. 14, taken from line 17-17 of FIG. 16.
Figure 15:
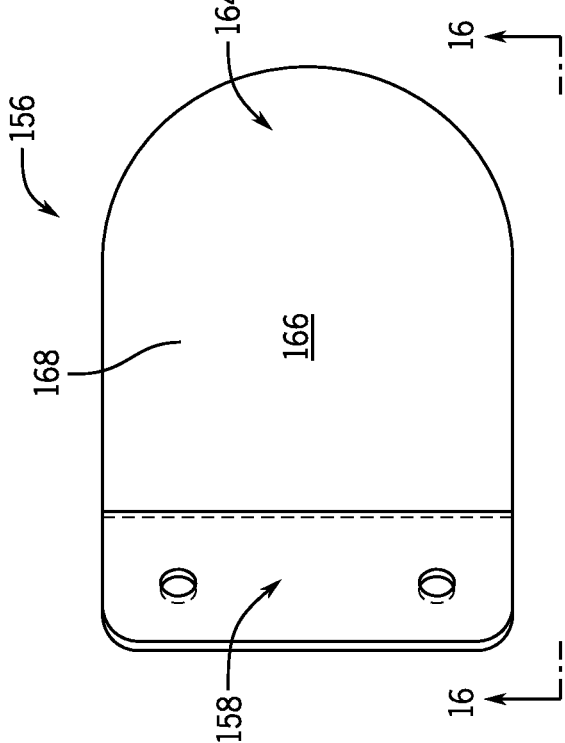
FIG. 15 is a plan view of the reflective pilot light viewer shown in FIG. 14, taken from line 15-15 of FIG. 14.
Figure 16:
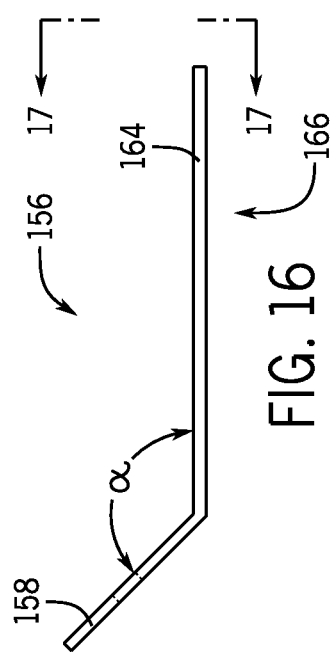
FIG. 16 is a side elevation view of the reflective pilot light viewer shown in FIG. 14, taken from line 16-16 of FIG. 15.

In one or more examples of embodiments, such as can be seen in FIGS. 3-5, the water tank 102 may have a lower outer cover or access outer panel 132 that may be removed from the water tank 102. In reference to FIGS. 6-7, the access outer panel 132 has a first flange 134 and a second flange 136 which are offset from the access outer panel body 138 and slot within first and second openings or against first and second walls of an access opening 140 in the water tank 102. One or more apertures 142 may be provided in the first and second flanges 134, 136 for further attachment by fasteners (not shown) to the water tank 102.

Referring to FIGS. 3-13, the access outer panel 132 is formed of a body 138 having the first and second flanges 134, 136 noted above. The body 138 has a central portion 144, positioned between first and second segments 146, 148, which central portion 144 forms a recess 150 on one side so as to provide clearance for and thereby cover any piping 152, as well as an air intake 126 and other components such as a thermocouple 118 (e.g., see FIG. 2). In one or more alternative examples of embodiments, the body 138 may also include one or more approximately horizontal support flanges 151 (see e.g., FIG. 10-11). In one or more examples of embodiments, the access outer panel has a degree of curvature or a depth which places the first and second flanges 134, 136 approximately 4.0 inches behind the outer surface of the first and second segments 146, 148 and approximately 4.38 inches behind the outer surface of the central portion 144. The width of the access outer panel ranges from approximately 13.75 inches to 14.38 inches in one or more specific examples of embodiments, and includes a central portion which is approximately 3.5 inches in width. The height of the access panel may be approximately 9.25 inches.

The access outer panel 132 also has an opening or aperture 154 positioned on one of the first or second segments 146, 148. The opening 154 forms a viewing window for viewing the pilot light 122. Accordingly, the opening 154 is preferably horizontally aligned with the pilot light 122 and positioned such that the view of the pilot light 122 is unobstructed (see FIG. 5). In one or more specific examples of embodiments, the center of the opening 154 is positioned approximately 3.38 inches from the edge of the access panel and approximately 4.69 inches from the bottom of the access panel. The opening 154 in the illustrated example is a circular opening having a diameter of approximately 2.13 inches, although variations thereon suitable for the purposes provided are also acceptable. The opening, in one or more examples, may be a punch out. In one or more further examples of embodiments, the opening 154 is covered by a transparent material, such as a glass or durable clear plastic. In other embodiments, the opening 154 remains uncovered.

The access outer panel 132 is preferably formed of material similar to the water heater 100, including, for example, aluminum, steel, and other alloys which are not prone to rust or melt under the conditions of the water heater. In one or more specific examples of embodiments, the access outer panel 132 is a stamped steel cover. According to one or more particular examples of embodiments, the access outer panel has an approximate wall thickness of 0.031 inches.

Attached to the panel segment 146 or 148 below the opening 154 or viewing window is a reflective pilot light viewer 156. According to one or more particular examples of embodiments, the reflective pilot light viewer has an overall length of approximately 3.37 inches, a width of approximately 2.4 inches, and a total height of approximately 0.81 inches. The reflective pilot light viewer 156 is formed of a suitable durable material for use with a water heater 100, one or more examples of which include a metal such as aluminum, stainless steel, or other alloys which are not prone to rust or melt. According to one or more specific examples of embodiments, the reflective pilot light viewer material has a thickness of approximately 0.0625 inches. Referring to FIGS. 5-9 and 14-17, the reflective pilot light viewer 156 has an attachment flange 158 which is secured to the access outer panel 132. In the illustrated example, the attachment flange 158 is secured to the access panel body 138 by first and second fasteners 160, 162 (e.g., screws) which extend through the flange and into the access outer panel, although alternative mechanisms of attachment suitable for the purposes provided are also acceptable. The reflective pilot light viewer 156 also has a viewing segment 164 which is joined to and extends from the attachment flange 158, and as a result extends from the access outer panel when attached. In particular, the viewing segment 164 extends from the attachment flange 158 and an attached access outer panel at an angle (α) (see FIG. 8).

More preferably, the viewing segment 164 extends from the horizontally positioned access outer panel 132 on the water heater at an angle (α) which is an approximate forty-five to fifty degree (45° to 50°) angle to the panel. In this regard, the viewing segment 164 is joined to the attachment flange at an approximate one-hundred and thirty degree to one-hundred and thirty five degree (130° to 135°) angle (α') (see FIG. 16). The reflective pilot light viewer 156 has a reflective surface 166 on at least a portion 168 of the viewing segment 164. The reflective surface 166 preferably covers all or substantially all the upward facing portion 168 of the viewing segment 164 shown in the Figures. The reflective surface 166 may be formed of any suitable reflective material including, but not limited to, a highly polished chrome or alloy surface or a glass-type surface such as a mirror. Preferably, the material is sufficiently durable to withstand any heat transferred by the water heater 100 and is easily cleanable. One or more examples of forming the reflective pilot light viewer 156 include stamping, cutting or punching a viewer having the desired shape from a sheet of material, then bending the material to the appropriate angle. In an alternative embodiment, the material may be molded to the suitable shape. The reflective surface 166 may be attached by adhesive, fastener(s), or otherwise to the portion 168, or alternatively may be integral with the viewing surface or for example may be formed by common means of creating a polished alloy (e.g., chrome) surface.

While specific materials and dimensions are provided herein, these details are provided for purposes of example and illustration only. One of skill in the art would understand that variations thereon which allow viewing of a pilot light 122 positioned in view of an opening or viewing window 154 by a reflective pilot light viewer 156 attached to the device with the pilot light and viewable from a position away from the viewer may be acceptable (see FIG. 5). Likewise, while the invention described herein specifically relates to pilot lights for water heaters, the principals of the invention may be suitably applied to other pilot light-based systems or pilot electric ignition systems where it is necessary to view a pilot light or electric ignition from a difficult position or angle.

The reflective pilot light viewer 156 may be installed in existing (e.g., retrofit) or new water heaters 100. In new water heaters 100, the reflective pilot light viewer 156 is installed on the lower portion of the water tank 102 or on the access outer panel 132 in a position adjacent a viewing window 154 in the manner described herein. In one or more alternative examples of embodiments, the reflective pilot light viewer 156 may be installed in an existing water heater 100 by replacement of the access outer panel with the new access outer panel 132 described herein having the viewing window 154 and attached reflective pilot light viewer 156. In alternative embodiments, the reflective pilot light viewer 156 may be installed on an existing water heater 100 by attachment of the attachment flange 158 immediately adjacent, and preferably below an opening 154 in the water heater 100 for viewing the pilot light 122, or by cutting an opening 154 at an acceptable location and attaching the attachment flange 158 of the reflective pilot light viewer 156 in the noted manner. The attachment flange 158 may be attached by insertion of the fasteners as described herein or by other now known or future developed means.

In operation, the pilot light 122 remains lit so that the burner 120 can be ignited when a service call is received by the water heater 100 unit. For example, when the water in the tank 102 of a hot water heater 100 cools to below the set temperature threshold of a thermostat, the cooling causes the gas valve to open which allows the gas to flow to the main burner 120 and be lighted by the standing pilot light 122. When the water temperature in the tank 102 rises and satisfies the set temperature threshold of the thermostat, the valve is then closed, but the pilot light 122 remains lit when the water heater 100 is functioning properly.

A user may view the pilot light 122 to determine if it is lit and functioning properly by standing above the reflective pilot light viewer 156 in proximity to the sight line (b) of the viewer (see e.g., FIG. 5). The viewer reflects the light of the pilot flame, and as a result, the user can determine whether or not the pilot light 122 has been extinguished or remains lit.

The reflective pilot light viewer and access outer panel with attached reflective pilot light viewer described herein provide various advantages. For example, the reflective pilot light viewer improves viewing of the status of a pilot light in a water heater. Using the reflective pilot light viewer, users do not need to stoop low to the ground to view the pilot light, nor do users need to remove the access outer panel or cover to view the pilot light. The viewer reflects the light of the pilot light flame, making it easy to see whether it is properly lit from above. Accordingly, the reflective pilot light viewer, access outer panel, and corresponding water heater described herein provide a means to view a pilot light in a safe and comfortable position. Moreover, the reflective pilot light viewer and corresponding access outer panel provide a cost-effective easy to manufacture product which is easy to assemble and/or easy to retrofit to an existing water heater.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments.

Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A water heater access outer panel comprising:
   a panel body configured to cover an opening in and be affixed to a water tank of a water heater, the panel body having a viewing window which aligns with a pilot light when the access outer panel is positioned on the water tank; and
   a reflective pilot light viewer comprising a one-piece sheet of material forming:
      an attachment flange and a viewing segment which is integral and continuous with the attachment flange across an overall width of the sheet of material, wherein the viewing segment extends from the attachment flange at a fixed angle;
   wherein the attachment flange is attached to the panel body by fasteners below the viewing window and the viewing segment extends at the fixed angle of approximately forty-five to fifty degrees from the panel body, and wherein first and second fasteners extend through the attachment flange and into the access outer panel; and
   the viewing segment has an upper portion which is a fixed position reflective surface and is aligned with the viewing window at the fixed angle so as to reflect the pilot light.

2. The access outer panel of claim 1, wherein the reflective pilot light viewer reflective surface is a mirror.

3. The access outer panel of claim 1, wherein the reflective pilot light viewer reflective surface is a polished alloy.

4. A water heater having the access outer panel of claim 1.

5. The water heater access outer panel of claim 1, wherein the reflective pilot light viewer is formed of a durable material suitable for use with a water heater.

6. The water heater access outer panel of claim 1, wherein the attachment flange comprises a flat surface across an entire attachment side surface, and wherein the attachment flange attachment side surface is attached flush to the access outer panel.

7. The water heater access outer panel of claim 1, wherein the entire viewing segment is a flat planar segment.

8. The water heater access outer panel of claim 1, wherein the panel body has first and second flanges offset from the panel body and arranged to slot within an opening in a water tank of the water heater.

9. A water heater comprising:
   a water tank having a gas control, a thermostat control and thermocouple for controlling a gas-fired burner, and a pilot light to ignite the gas flowing into the burner;
   an access outer panel removable from a lower portion of the water tank, the access outer panel having a viewing window positioned horizontally adjacent to the pilot light; and
   a reflective pilot light viewer attached to the access outer panel proximate and below the viewing window, the reflective pilot light viewer comprising a one-piece sheet of material forming an attachment flange which is attached to the access outer panel by first and second fasteners which extend through the attachment flange and into the access outer panel, and a viewing segment which is integral and continuous with the attachment flange across an overall width of the sheet of material, wherein the viewing segment extends upwards from the attachment flange at a fixed angle, the fixed angle being an angle of approximately forty-five to fifty degrees from the panel body, and the viewing segment having an upper portion which is a fixed position reflective surface and is aligned with the viewing window at the fixed angle so as to reflect the pilot light upwards.

10. The water heater of claim 9, wherein the reflective surface is a mirror.

11. The water heater of claim 9, wherein the reflective surface is a polished alloy.

12. The water heater of claim 9, wherein the reflective pilot light viewer is formed of a durable material suitable for use with a water heater.

13. The water heater of claim 9, wherein the attachment flange comprises a flat surface across an entire attachment side surface, and wherein the attachment flange attachment side surface is attached flush to the access outer panel.

14. The water heater of claim 9, wherein the entire viewing segment is a flat planar segment.

* * * * *